Aug. 24, 1948.  A. M. BLANEY  2,447,557
COLLAPSIBLE PERAMBULATOR OR PUSH-CHAIR
Filed Nov. 5, 1945  3 Sheets-Sheet 1

INVENTOR
AUBREY M. BLANEY
By
Atty

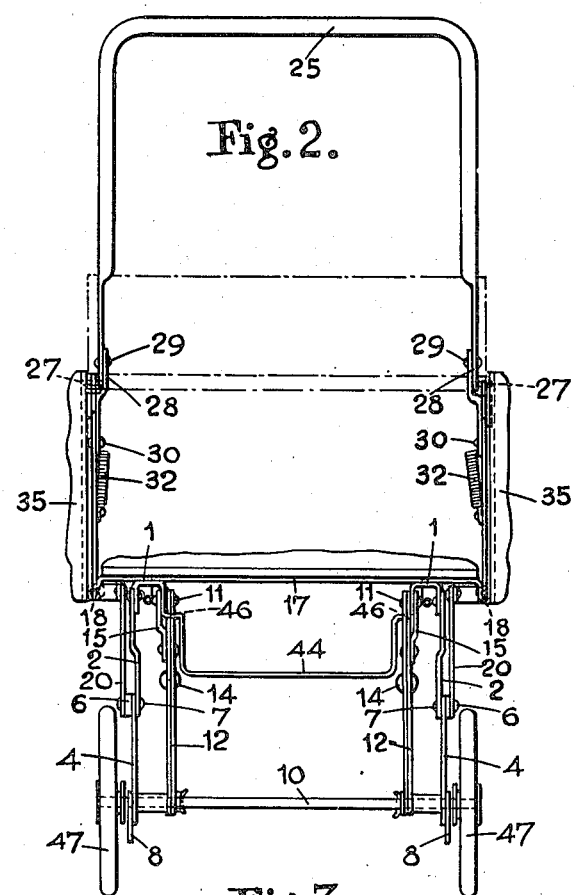

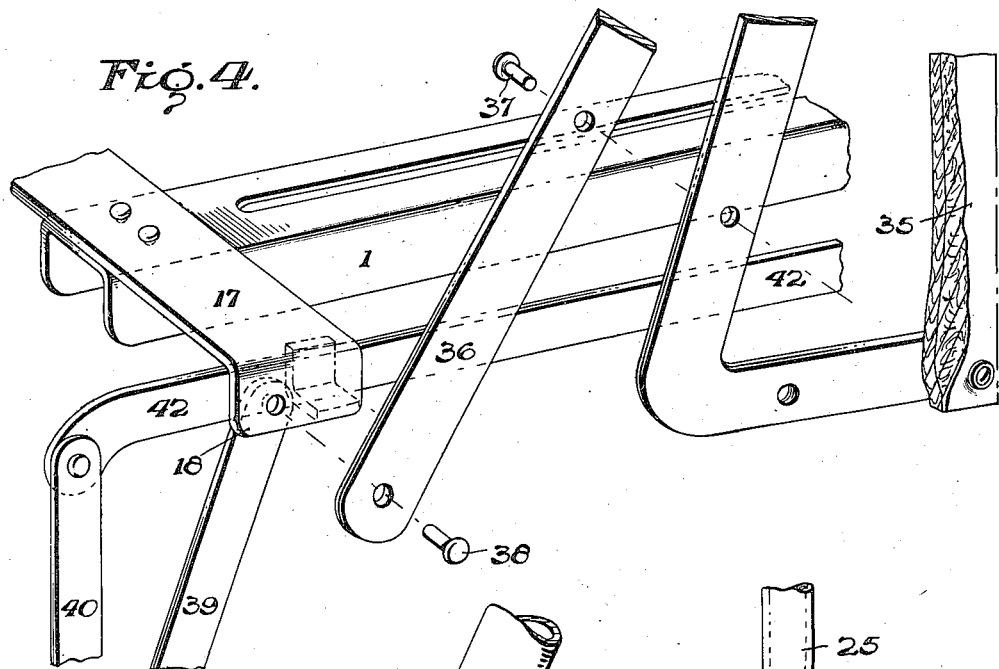
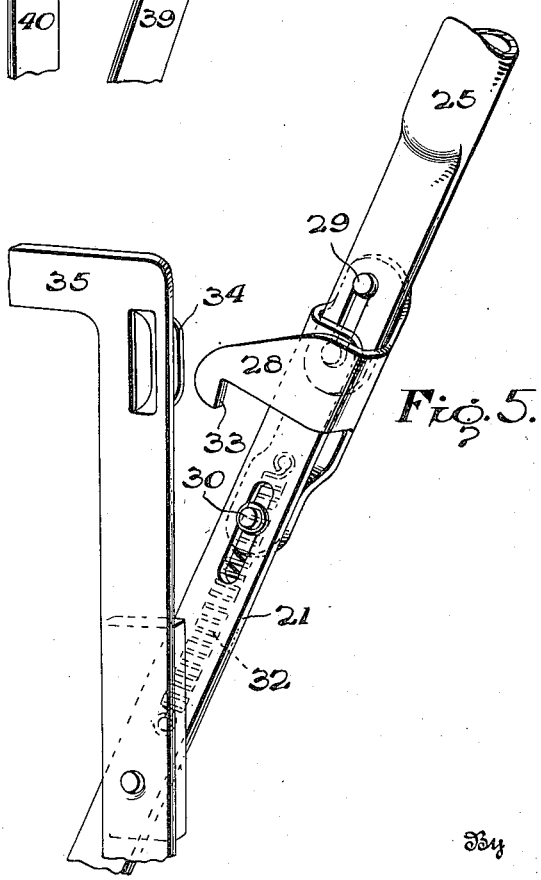
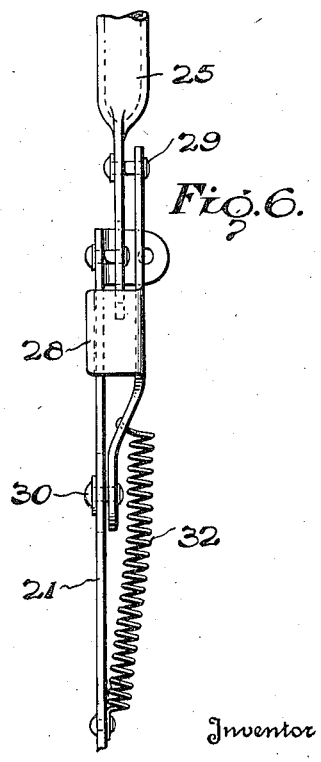

Patented Aug. 24, 1948

2,447,557

UNITED STATES PATENT OFFICE 2,447,557

COLLAPSIBLE PERAMBULATOR OR PUSH CHAIR

Aubrey Middleton Blaney, Barkingside, Ilford, England

Application November 5, 1945, Serial No. 626,777
In Great Britain April 3, 1944

Section 1, Public Law 690, August 8, 1946
Patent expires April 3, 1964

5 Claims. (Cl. 280—37)

This invention has reference to improvements in collapsible perambulators or push-chairs for infants and has for its object to provide an efficient construction wherein the parts may be readily and simply adjusted to their two alternative positions, (a) locked together as a sturdy structure especially when opened out for use, and (b) compactly collapsed and packed together within a rectangular box-like structure made up by the existing seat, sides, back and step of the carriage to look very much like a suit-case.

According to the invention there is provided a perambulator or push-chair comprising a chassis with a seat framework, parallel linkage pivoted on each side to said seat frame-work and carrying a pair of longitudinal supports for two axles, sprung elements also pivoted to said seat framework adjacent said parallel linkage and adapted to restrain the movement of the wheel axles during the collapsing operation, a transversely folded and pivoted back adapted to be swung down to form two sides of the container holding the collapsed vehicle, a folding handle and levers in association therewith for collapsing the parallel linkage with a small effort, a step capable of folding inwards to form a third side of the container, two sides of the body being also adapted to be folded down to form a fourth and fifth side of the container, the sixth side of the container being formed by the seat proper resting on the seat framework.

An embodiment of the invention will be described in detail with reference to the accompanying drawings in which:

Figure 2 shows an end view seen from the rear of Figure 1;

Figure 3 shows the perambulator or push-chair collapsed for transportation.

Figure 4 is a fragmentary front side perspective view of the framework and side linkage connections;

Figure 5 is a broken away side elevation view of a rear portion of the side frame and handle connections therefor; and Figure 6 is an end view of the parts illustrated in Fig. 5.

Figure 1:
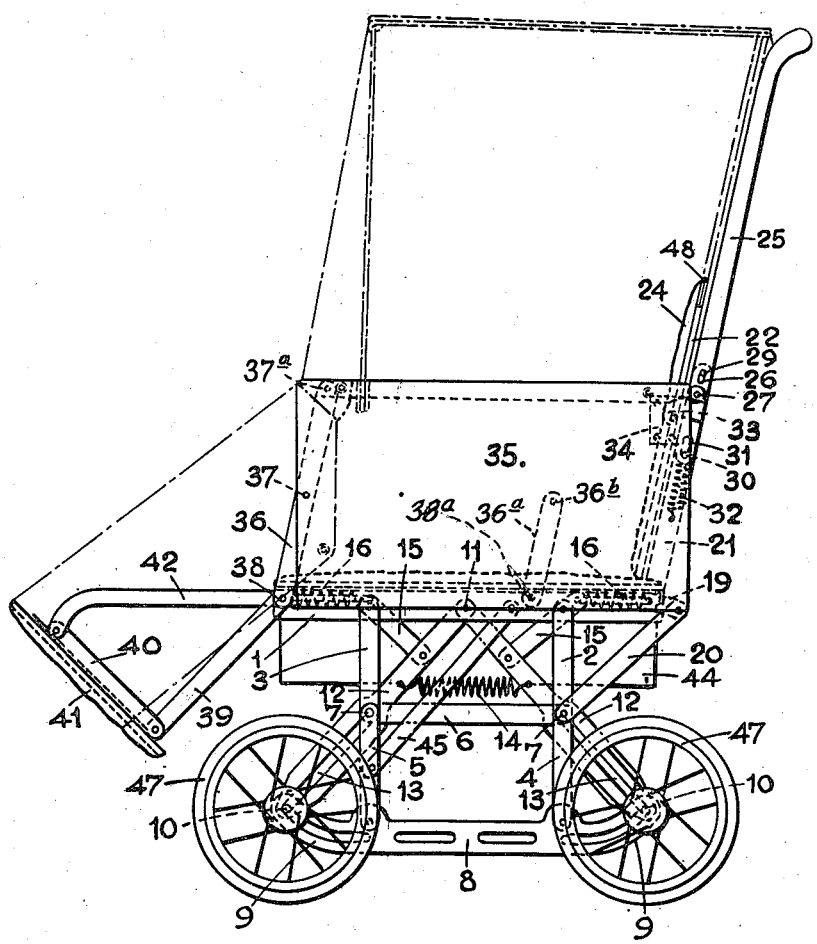
Figure 1 shows the perambulator or push-chair opened out ready for use in side elevation.

Referring to the drawing, the seat framework of the chassis includes two main longitudinal side bearers 1 of inverted channel section. These bearers 1 are preferably integrally formed by stamping with a well 44 which will serve as a case for storing away an apron and folding hood used for protection in wet weather, as is indicated in dot-dash lines in Figure 1.

The following linkage and other members associated with the seat framework to be described hereinbelow are duplicated, i. e. a similar set and arrangement is provided for each bearer 1. To the outside downdardly depending flange of the bearer 1 is pivoted a parallel linkage consisting of two spaced apart and parallel upper links 2 and 3 and two similar lower links 4 and 5 pivoted thereto in extension. The pairs of upper and lower links are joined, parallel to the bearers 1, by a longitudinal connecting link 6, and the lower link 5 is pivotally joined by a link 45 to the rearward half of the bearer 1.

To the free ends of the lower links 4 and 5 is pivoted a longitudinal wheel support 8 for a pair of axles, and this support 8 spans the lower links and has upturned horns 9 projecting outwardly from the links, each of these horns being longitudinally slotted for the accommodation of a wheel axle 10.

On a pivot 11, centrally disposed on the inside downwardly depending flange of the bearer 1, a pair of arms 12 are pivotally mounted so as to splay divergently in a downward direction. These arms 12 are passed through slots 46 formed in the horizontal portions of steps stamped into the sides of the well 44. The lower ends of these arms 12 are widened and have longitudinal slots 13 for the reception of the axles 10 carrying wheels 47 which axles are thus passed, at each of their ends, through one such arm 12 and also through a horn 9 of the wheel support 8 as aforesaid. The pair of divergent arms 12 are spring-controlled to restrain outward or splaying movement, for instance by a tension spring 14 secured therebetween. In addition, from a point substantially midway between the pivot 11 and the point of application of the spring 14, a link 15 is carried from each arm 12 up to the underside of the bearer 1 and is adapted to slide along said underside under the action of a compression spring 16. The other end of each of these springs 16 is secured to depending lugs on the underside of the bearers 1. These springs 16 serve to yieldably resist the movement of the links 15 when the perambulator or pram is collapsed and reassert themselves to assist in the opening out of the pram.

Across either end, the bearers 1 carry transverse strips 17 with their projecting ends turned down to form lugs 18. At the back of the bearers 1, the lugs 18 carry bell crank levers having a short arm 19 pivoted to a link 20 leading to the pivot common to the upper and lower limbs 2 and 4 and the longitudinal link 6. The other arm 21 of this bell-crank lever is appreciably longer and supports the main back rest 22 which is made in two parts jointed together by a hinge 23 for the purpose to be described hereinbelow. To this main back rest 22 there is joined by a hinge 48 a subsidiary upholstered back rest 24 which, in the opened out position shown in Figures 1 and 2, depends downwardly on the inside of the main back rest.

The arms 21 and 27 are pivoted to and continued upwardly by a U-shaped tubular handle 25. This handle 25 is maintained in its extended position by means of a catch member 28 with pins 29 and 30 in engagement with slots 26 and 31 formed in the handle 25 and the arm 21 respectively. The catch member 28 is further subjected to the downward pull of a spring 32 keeping its hook-shaped projection 33 in locking engagement with a projection 34 mounted in a concealed position on the inside of each of the upholstered side members 35. The side members 35 are pivoted to the bearers 1 and are adapted to be folded downward for the collapsed position.

The side members 35 are further maintained in their opened position by swivel arms 36 pivoted at 38 to the down-turned lugs 18 of the transverse strip 17 at the front end of the bearers 1 and by arms 36a pivoted at 38a and 36b toward the rear of the bearers, see Figure 1. A rivet 37 secures each side member 35 to swivel arm 36 so that these two parts may be kept in their correct relative positions.

When the side members 35 swing down in their own plane during collapsing of the pram, they swing with the swivel arms 36 pivoted at 38 and with the swivel arms 36a to which the sides 35 are also pivoted at 36b. The arms 36, as shown in Fig. 1, extend upwardly towards the tops of the sides 35. To add to the rigidity of the sides in their up or raised position there is provided a yieldable button generally indicated by 37a carried by each side adapted to frictionally engage with the flat top surface of each of the arms 36.

The pivots 38 on either side of the seat framework further carry a bar or strip 39 directed forwardly and downwardly to be joined each at its other end by an upwardly inclined strip or bar 40 adapted to support a rubber-faced step 41 upholstered on its lower side. The strips 40 have their other ends linked to curved strip members 42 whose free straight end portions are adapted to slide parallel to and along the outside of the bearers 1 being held by a suitable keeper rigidly fixed in relation to bearer 1, and are fitted with hook-shaped members, not shown, which are, in the closed position engaged by the arm 19 on the bell crank lever 21 for locking the step assembly in the closed position. A handle 49 is fixed to the exterior of the main back rest 22.

The collapse of the perambulator or push-chair into the compact or carriage position is brought about in the following manner:

The catch member 28 is raised slightly to disengage its hook-shaped projection 33 from the projection 34. The front of the seat framework is now seized by say the left hand of the operator and the handle 25 by the right hand. The handle 25 is then subjected to a slight rearward and downward pressure which will cause the shorter bell-crank arm 19 to move in clockwise direction and push the links 20 and 6 towards the front of the chassis, taking with them the side members 35 backwardly and downwardly moving in their own plane. The upper and lower links 2, 3 and 4, 5 are thus caused to close together V-wise and draw up the wheel support 8. In being thus drawn up the wheel axles 10 are guided by the slots 13 in the divergent arms 12 whose position relative to the seat framework is materially the same in the collapsed state.

It will be seen from Figure 3, when the wheel axles 10 are drawn up in the slots 13, they will have moved towards one another along the slotted horns 9 until the wheels 47 touch one another. At this point of the collapsing operation, the shorter bell crank arm 19 will have nearly moved through a semi-circle and assumed a position parallel to the bearer 1. The longer bell crank arm 21 rotated through the same angle will now be positioned at right angles to the bearers 1 and will be pointing downwards.

The catch member 28 is now further pulled against the action of the spring 32 until its projection 33 clears the end of the longer bell crank arm 21. The rigid connection between the handle 25 and the arm 21 is thus broken. The handle 25 can now be rotated about the pivot 27 through a right angle into the position shown in Figure 3. The catch member 28, it will be observed, now occupies an inclined position in the bottom right hand corner of the container.

As will be apparent from the drawing, as the arm 21 has been brought into the collapsed position, the main and subsidiary back rests 22 and 24 will have followed it in its movement and will still occupy a position parallel to it. The main back rest 22 is now broken about the hinge 23 already referred to and the subsidiary back rest 24 is folded about the hinge 48 through three quarters of a circle until it comes up against the handle 25 and occupies the position shown in Figure 3.

The collapse of the perambulator, or push chair, is completed by pushing the curved strip members 42 towards the rear of the chassis until their hook-shaped members above described are engaged by the shorter bell crank levers 19 and tightly locked in position thereby. During this inward movement of the curved strip members 42 the bars 39 will be lowered into a position perpendicular to the bearers 1, as can be readily visualised, and the step 41 will be pulled up against the bar 39. The upholstered underside of the step 41 will thus complete the rectangular container holding the collapsed vehicle, the other sides of the container being formed as described by the seat proper 43, the main and subsidiary back rests 22 and 24 and the side members 35, the latter automatically swinging backwardly and downwardly in their own plane to a lowered position during the collapsing of the perambulator.

I claim:

1. An improved collapsible perambulator or push-chair comprising a chassis with a seat framework, parallel linkage pivoted on each side to said seat framework and carrying a pair of longitudinal supports for two axles, spring elements also pivoted to said seat framework adjacent said parallel linkage and adapted to restrain the movement of the wheel axles during the collapsing operation, a transversely folded and pivoted back adapted to be swung down to form two sides of a container holding the collapsed vehicle, a folding handle and levers in association therewith for collapsing the parallel linkage with a small effort, a step capable of folding inwards to form a third side of the container, two sides of the body being also adapted to be folded down to form a fourth and fifth side of the container, the sixth side of the container being formed by the seat proper resting on the seat framework.

2. An improved collapsible perambulator or push-chair comprising a chassis with a seat framework, parallel linkage pivoted on each side to said seat framework and carrying a pair of longitudinal supports for two axles, spring elements also pivoted to said seat framework adjacent said parallel linkage and adapted to restrain the movement of the wheel axles during the collapsing operation, a transversely folded and pivoted back adapted to be swung down to form two sides of a container holding the collapsed vehicle, a folding handle and levers in association therewith for collapsing the parallel linkage with a small effort, a step capable of folding inwards to form a third side of the container, linkage pivotally connected to said step and to the front edge of the chassis, lock means carried by said levers associated with said folding handle when said step is folded inwards to form the third side of said container, two sides of the body being also adapted to be folded down to form a fourth and fifth side of the container, the sixth side of the container being formed by the seat proper resting on the seat framework.

3. A collapsible perambulator, comprising a chassis having side bearers of inverted channel section, said bearers being integrally formed, a well formed from said bearers adapted to serve as a storage case, a seat framework carried by the said chassis, parallel linkage pivoted on each side to said seat framework and carrying a pair of longitudinal supports for two axles, spring elements also pivoted to said seat framework adjacent said parallel linkage and adapted to restrain the movement of the wheel axles during the collapsing operation, a transversely folded and pivoted back adapted to be swung down to form two sides of a container holding the collapsed vehicle, a folding handle and levers in association therewith for collapsing the parallel linkage with a small effort, a step capable of folding inwards to form a third side of the container, two sides of the body being also adapted to be folded down to form a fourth and fifth side of the container, the sixth side of the container being formed by the seat proper resting on the seat framework.

4. An improved collapsible perambulator or push-chair comprising a chassis with a seat framework, parallel linkage pivoted on each side to said seat framework and carrying a pair of longitudinal supports for two axles; wheels journalled on said axles, said longitudinal supports spanning the lower extremities of said parallel linkage extended below the seat framework and having upturned slotted ends for said axles; spring elements also pivoted to said seat framework adjacent said parallel linkage and adapted to restrain the movement of the wheel axles during the collapsing operation, a transversely folded and pivoted back adapted to be swung down to form two sides of a container holding the collapsed vehicle, a folding handle and levers in association therewith for collapsing the parallel linkage with a small effort, a step capable of folding inwards to form a third side of the container, two sides of the body being also adapted to be folded down to form a fourth and fifth side of the container, the sixth side of the container being formed by the seat proper resting on the seat framework.

5. An improved collapsible perambulator or push-chair comprising a chassis with a seat framework, parallel linkage pivoted on each side to said seat framework and carrying a pair of longitudinal supports for two axles, spring elements also pivoted to said seat framework adjacent said parallel linkage and adapted to restrain the movement of the wheel axles during the collapsing operation, a pair of diverging arms having slotted ends around each end of the wheel axles between the said longitudinal supports, a spring mounted between the arms to restrain the movement of the wheel axles in the collapsing operation, a transversely folded and pivoted back adapted to be swung down to form two sides of a container holding the collapsed vehicle, a folding handle and levers in association therewith for collapsing the parallel linkage with a small effort, a step capable of folding inwards to form a third side of the container, two sides of the body being also adapted to be folded down to form a fourth and fifth side of the container, the sixth side of the container being formed by the seat proper resting on the seat framework.

AUBREY MIDDLETON BLANEY.

REFERENCES CITED

The following references are of record in the file of this patent:

UNITED STATES PATENTS

| Number | Name | Date |
| --- | --- | --- |
| 1,076,087 | Wannenwetsch | Oct. 21, 1913 |